14. BRIDGE
Truss, Details,
14 Connections.
3 Sheets-Sheet 1
A. Fink.
Truss Bridge.
No. 4,093. Reissued Aug. 9, 1870
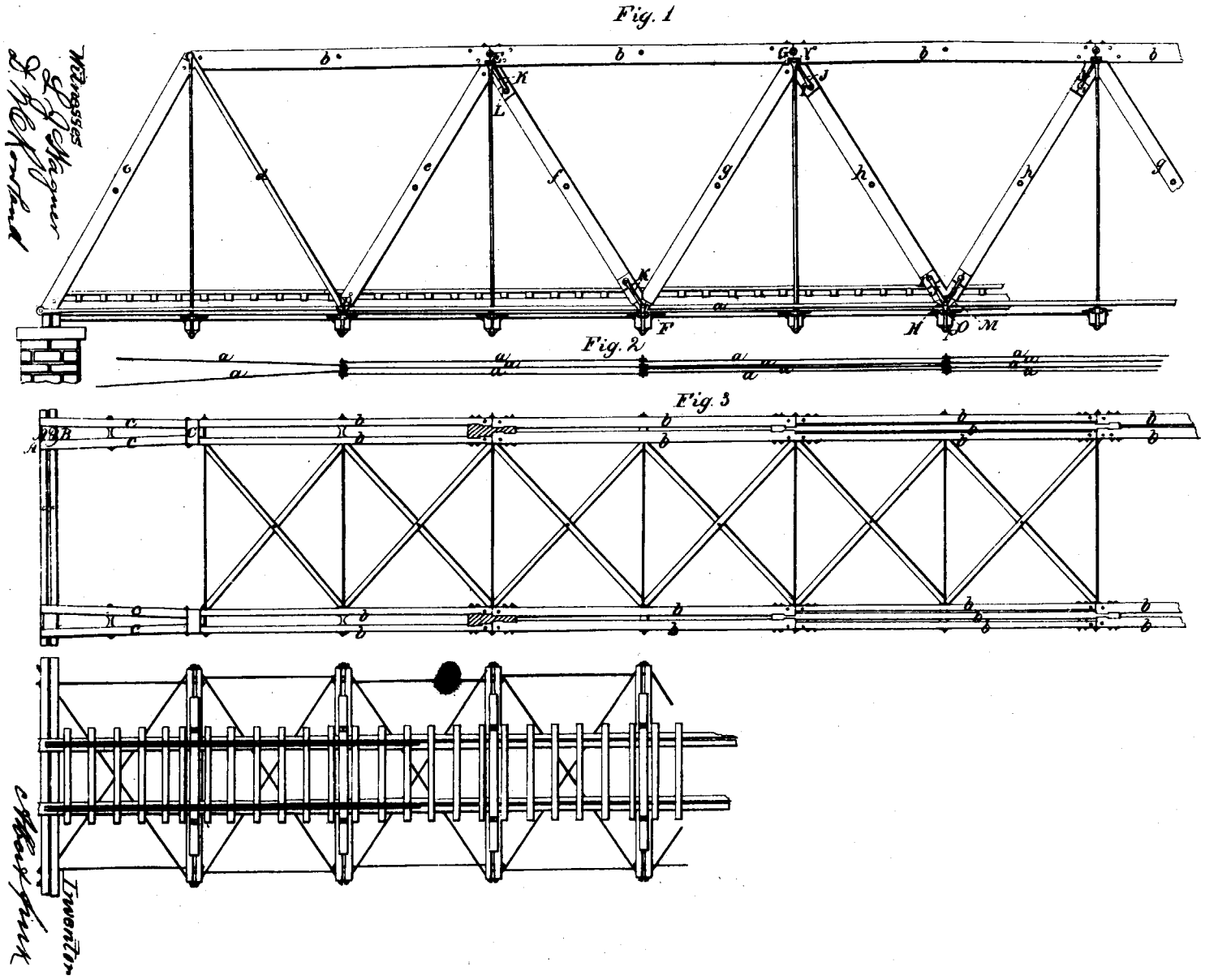
N. PETERS, PHOTO-LITHOGRAPHER, WASHINGTON, D. C.

14. BRIDGES.
Truss. Details,
Connections.
1/4
3 Sheets-Sheet 2.
DRAWING
A. Fink.
Truss Bridge.
No. 4,093. Reissued Aug. 9, 1870.
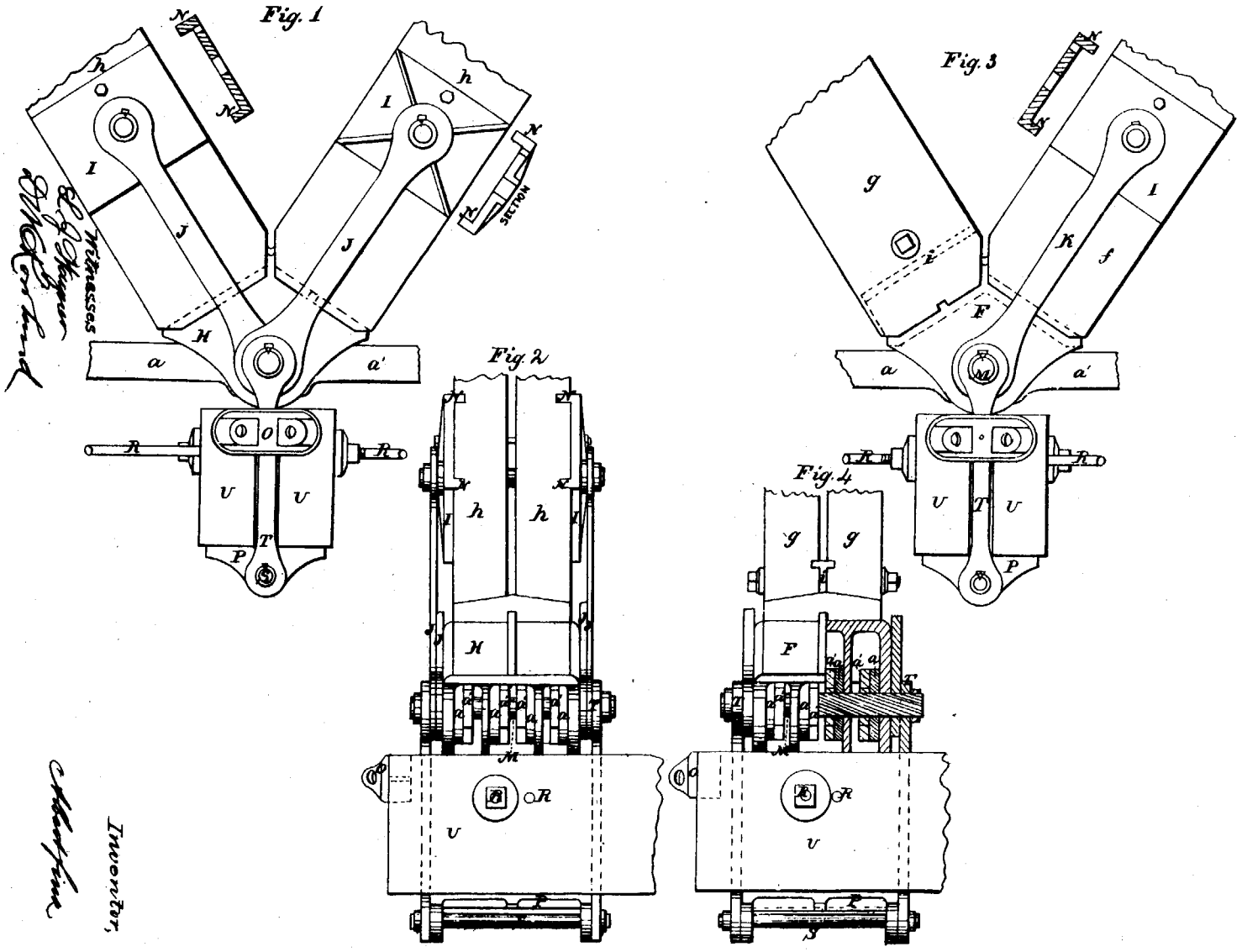
N. PETERS, PHOTO-LITHOGRAPHER, WASHINGTON, D. C.

14
Connect. Dec.
3 Sheets-Sheet 3
A. Fink.
Truss Bridge.
No. 4,093. Reissued Aug. 9, 1870.
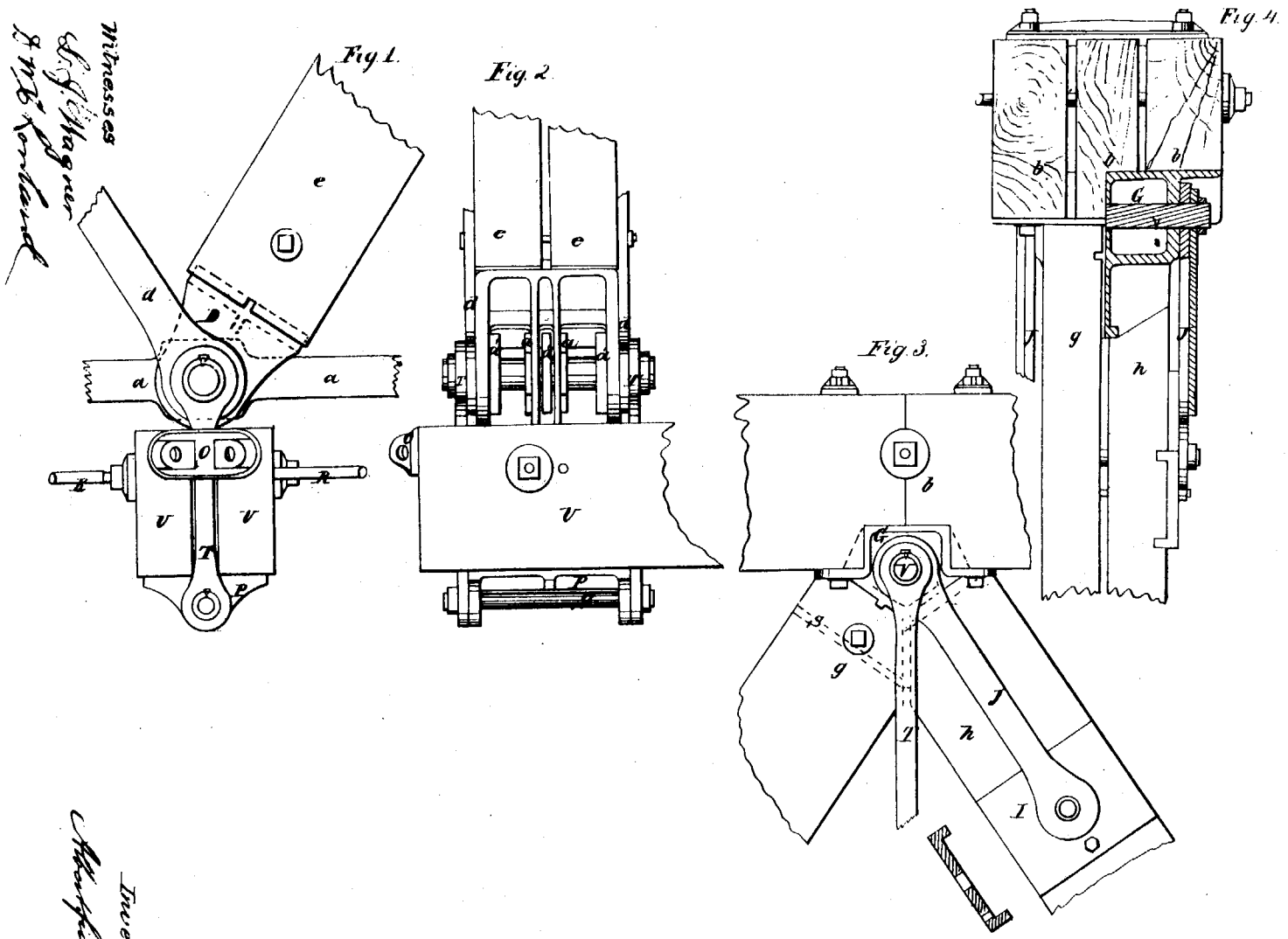
Witnesses
L. J. Wagner
J. W. B. Lonland
Inventor
A. Fink
N. PETERS, PHOTO-LITHOGRAPHER, WASHINGTON, D. C.

United States Patent Office.

ALBERT FINK, OF LOUISVILLE, KENTUCKY.

*Letters Patent No.* 63,714, *dated April* 9, 1867; *reissue No.* 4,093, *dated August* 9, 1870.

IMPROVEMENT IN BRIDGES.

The Schedule referred to in these Letters Patent and making part of the same.

*To all whom it may concern:*

Be it known that I, ALBERT FINK, of Louisville, Jefferson county, Kentucky, have invented an Improvement in Bridge-Trusses; and I do declare that the following is an exact description thereof, reference being had to the accompanying drawing and to the letters of reference marked thereon.

It is well known that the lower chords of wooden bridges are the parts of these structures first to give way, a comparatively small amount of decay, requiring from six to eight years of time in uncovered structures, being sufficient to cause the failure of the lower chords of wooden bridges.

If covered, so as to be protected from the effect of the weather, the structure is in great danger of destruction by fire or high winds, the amount of surface for the action of these agents being so much increased. In order to remedy this defect in wooden bridges, I substitute a wrought-iron bottom chord for the wooden one, and adopt the triangular system of bracing between the two cords, both because this system best avoids evils arising from the unequal expansion of a wrought-iron bottom and a wooden top chord, and because it is the system of bracing having the least amount of material for equal strength with other systems. And, further, I so construct the braces that they may act as struts and as ties, or, in other words, so that they may resist strains of tension as well as of compression, in order that the various parts of the truss may never come out of adjustment, and the truss itself, under all conditions, whether the bottom chord be more or less expanded, may possess the same strength.

My invention, therefore, may be stated to consist in the combination of a wrought-iron bottom chord with a wooden top chord in a triangular truss, when connected together by a brace or braces so constructed as to be able to resist compressive as well as tensile strains, or, in other words, by braces which can act as struts and as ties, when placed in a position in which they may be required to act, under a moving load, at one time in the one, and at another time in the other capacity.

In this manner a more durable structure than the common wooden bridge is obtained without greatly increasing the cost; and, in order to give greater durability to the wooden portions of the bridge, I cover each top chord with a roof, and so arrange the timbers in both chords and braces that there may be a free circulation of air around them, and that any piece may be removed and replaced by new timber without trestling up the bridge, or interrupting the passage of trains.

To enable those skilled in the art of bridge-building to understand my invention I add the following description:

*Plate I.*

Figure 1 represents a general view of the improved bridge-truss;

Figure 2, *a a*, plan of the wrought-iron bottom chord; and

Figure 3, *b b*, the wooden top chord framed together with the top lateral bracing, both chords being carefully proportioned according to the strains.

*c c* are the end braces, resting in the cast-iron shoe B, which moves back and forward as the iron chord expands or contracts, on Plate A.

The whole structure sits on the wall-plates *o o*.

*d d*, fig. 1, are wrought-iron braces, and

*ee*, *f f*, *g g*, *h h*, and *c c* are wooden braces, between top and bottom chords.

*Plate II.*

Figures 1, 2, 3, and 4 show the connection of the wooden braces with the wrought-iron bottom chord.

H is a shoe-casting, which receives the braces *h h*.

The braces *h h*, fig. 2, consist of two sticks, in order that one of the sticks may be removed, if from decay or other causes it needs replacing, while the other is holding the bridge up, thereby rendering scaffolding unnecessary.

I and I, figs. 1 and 2, are castings, with lugs N let into the side of the braces *h h*; they are connected by the wrought-iron straps J J with the shoe-casting H.

A pin, M, passes through H and connects firmly, first, the links or bars of the iron chord *a a*, and second, the braces *h h* to each other, through the means of the straps J J and shoe-casting, and lastly, the braces and bottom chord. This connection allows the braces *h h* to act either as struts or ties, as the position of the moving load may require them to do.

From the pin M are suspended, by means of the links T and the casting P, the floor-beams U U.

O O is a casting, which receives the diagonal brace-rods.

R R are the rods which keep the floor-beams spaced, and which, with the diagonal rods, form the system of horizontal bracing of the floor of the bridge.

Plate II, figs. 3 and 4, shows the connection of braces *f g* to each other and to the wrought-iron bottom chord.

Under a load distributed uniformly over the whole truss, the brace *g* has to sustain a compressive strain only, but, under a moving load, it has also to sustain a small tensile strain.

The connection with the shoe-casting F, by the rib *i i*, enables the brace *g* to act as a tie to the extent required.

The connection of the shoe-casting F and the braces *f* and *g* and the chord *a a'* is made as before described.

*Plate III.*

Figures 1 and 2 show the connection of wrought-iron brace *d* with wooden brace *e*, and with iron chord *a a'*, the same letters denoting the same parts in figs. 1 and 2.

Plate III, Figures 3 and 4, show the connection of braces *g* and *h* with upper wooden chord *b b*, by means of casting G G, trace-strap J, and pin V.

Plate I, and strap J, form the tensile connection of *h* to *b*, as described in case of brace *h* and iron bottom chord *a a'*.

The rib *s* enables the brace *g* to resist the small tensile strain which is thrown in it by a moving load.

The braces, as herein shown, may be made either of wood or iron. Any one familiar with the well-established principles of bridge construction can proportion the various parts of this truss, so that they may resist the strains to which they are subjected.

I have now fully described the nature and object of my improvement. I do not claim as my invention the general arrangement of the braces, as this has long been in use for iron bridges, nor do I claim the use of an iron bottom chord in connection with a wooden top chord; but What I do claim as a new and useful improvement in bridge-trusses is—

The combination of a wrought-iron bottom chord and wooden top chord in a triangular truss, when both chords are connected together by a brace or braces so constructed as to be able to resist strains of compression as well as of tension, that is to say, by braces which can act as struts and as ties when placed in a position in a bridge-truss where, under a moving load, they may be required to act at one time in the one, and at another time in the other capacity, substantially as herein described.

In testimony whereof I have hereunto fixed my hand this 9th day of July, 1870, before two subscribing witnesses.

ALBERT FINK.

Witnesses:

C. L. HARRIS,

GEO. H. MCKINLEY.